2 Sheets--Sheet 1.

D. & D. F. LUSE.

Corn-Planters.

No. 6,078. Reissued Oct. 6, 1874.

Attest
J. B. Albert
Seth E. Smallwood

Inventor
Daniel Luse
Daniel F. Luse
by Wood & Boyd
attys.

2 Sheets--Sheet 2.

D. & D. F. LUSE.

Corn-Planters.

No. 6,078. Reissued Oct. 6, 1874.

Attest
J. B. Albert
Geo. Swallwood

Inventor
Daniel Luse
Daniel F. Luse
per Wood & Boyd
attys.

UNITED STATES PATENT OFFICE.

DANIEL LUSE AND DANIEL F. LUSE, OF CENTRE HALL, PENNSYLVANIA, ASSIGNORS TO THE HOSIER DRILL COMPANY.

IMPROVEMENT IN CORN-PLANTERS.

Specification forming part of Letters Patent No. 53,459, dated March 27, 1866; reissue No. 6,078, dated October 6, 1874; application filed August 31, 1874.

*To all whom it may concern:*

Be it known that we, DANIEL LUSE and DANIEL F. LUSE, of Centre Hall, formerly of Spring Mills, in the county of Centre and State of Pennsylvania, have invented certain new and useful Improvements in Corn-Planters, of which the following is a specification:

This invention relates to that class of corn-planters in which the seed is dropped by a disk revolving within the hopper; and consists in providing a peculiar furrow-plow, together with a novel arrangement of the drill-tooth, and a brush within the seed-box to secure regularity in the dropping.

Figure 1:
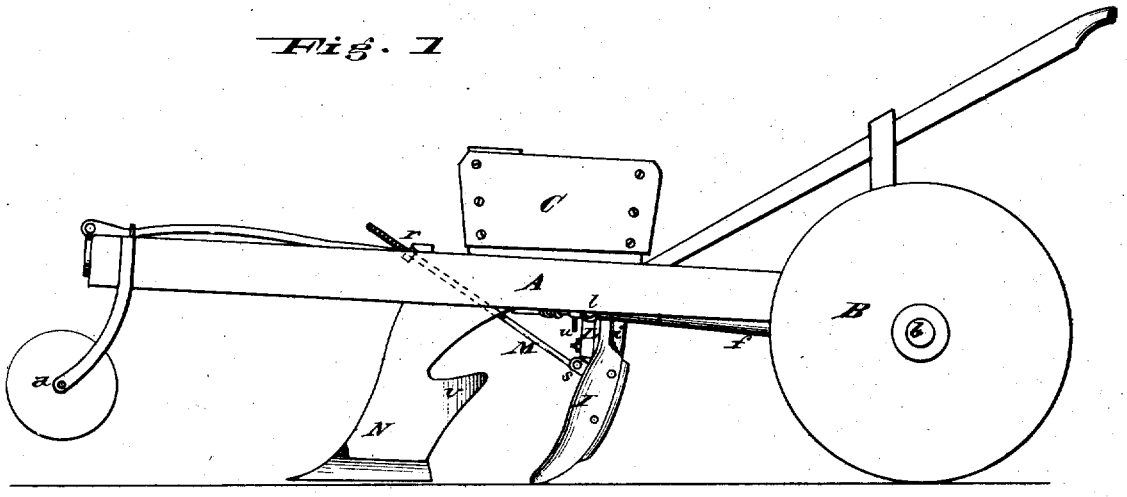
Figure 3:
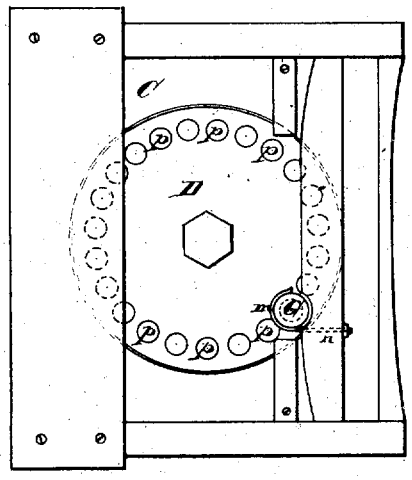
Figure 2:
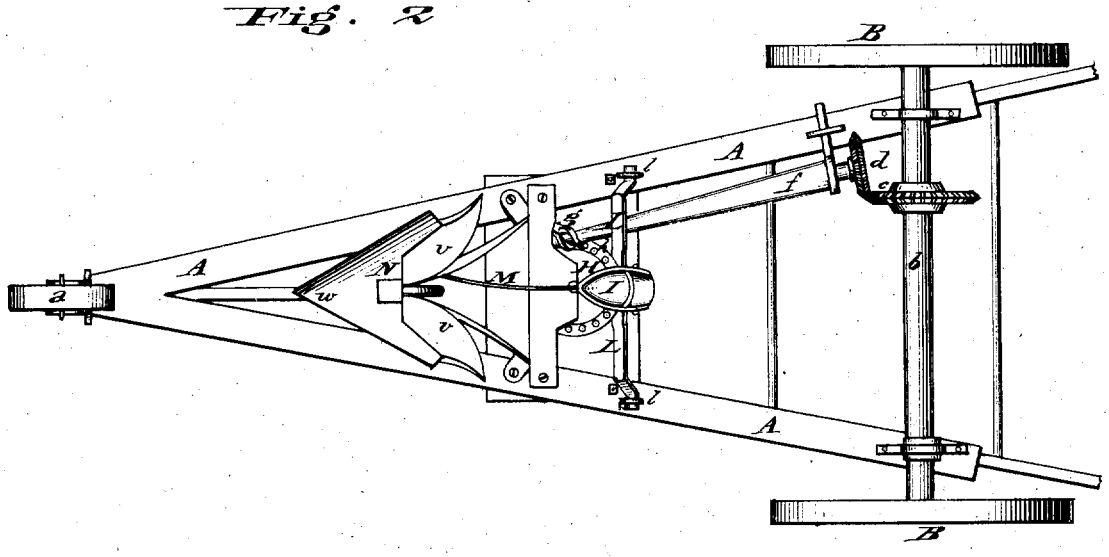
Figure 4:
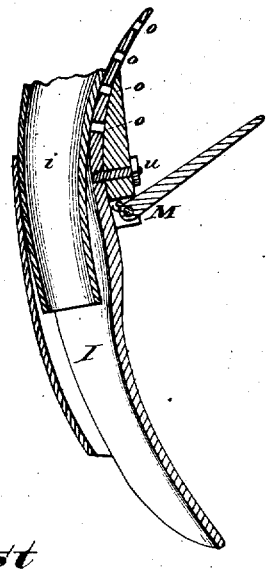
Figure 5:
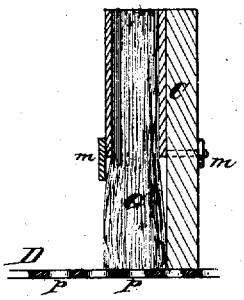

Figure 1 represents a side elevation of a corn-planter embodying our invention; Fig. 2, a bottom view of the same; Fig. 3, a plan of the seed-box and dropping apparatus therein; Fig. 4, a central vertical section of the seed-dropping drill-tooth and its immediate appendages, and Fig. 5 a central vertical section of the seed-brush and its fastenings.

We ordinarily employ a common triangular frame, A, supported by two wheels, B, near the rear end, and gaged in height by a caster-wheel, *a*, in front. The seed-box C is situated as usual, and is provided with an ordinary dropping-disk, D, which may be revolved in any appropriate manner by connecting mechanism underneath. G is a brush, located within the seed-box on the circle of the seed-holes *p*, and preferably in a cove, as shown in Fig. 3, so that seed cannot enter these holes between the brush and the delivery-hole. This brush is adjustable, so that it may be raised or lowered as may be necessary, depending on the size of the grain to be dropped or the quantity desired to be dropped, and when so adjusted prevents more than the desired quantity of grain being carried under it by the revolving disk to the delivery-opening. It is made round, so that when one side becomes worn by the action of the seed it may be turned to present a new front. We prefer to confine the bristles forming the brush in a tube, open or closed at the top, which serves as a handle; but they may be confined by wrapping, or in any well-known and appropriate manner. *m* is a curved hook, embracing the brush, as shown, and having a screw-shank reaching back through the side of the seed-box, and secured by a nut, *n*, which tightens the brush, as desired, and allows it to be adjusted at pleasure. When the brush reaches up to the cover of the seed-box, or is prevented from rising by any appropriate means, the curved hook *m* need not be screwed up so as to tightly engage the brush, but may loosely engage it, so as to allow it to revolve and adjust itself as to wear, though we prefer to have the hook tightly hold the brush. The drill-tooth I is fastened to a swinging bail, L, of crank form, whose bearings *l l* are above the under side of the frame. A flange, *t*, Fig. 4, projecting upward from the bail at the center, and provided with a bolt hole or holes, serves to attach the drill-tooth to the bail. There is a set of bolt-holes, *o o*, in the upper part of the drill-tooth, by which the depth of the drill-tooth's running may be adjusted to any desired extent, while the swinging of the bail enables the drill-tooth to be adjusted also to any angle desired. In order to adjust this angle a rod, *m*, is hinged to the drill-tooth at *s*, and extends thence forward and upward through the frame of the machine, and terminates in a screw-thread, so that a nut, *r*, thereon adjusts the length of the rod, as desired. The joint at *s* may have a wooden pin, which will break when any obstruction strikes the drill-tooth, thereby causing the same to give way without injury to the machine. The plow or furrow-clearer N in front of the drill-tooth has a regular double share, *w*, and two regular or complete mold-boards or wings, *v v*, whereby not only turfs and other undesirable obstructions are pushed aside from the furrow, but are turned away like a furrow-slice, thus invariably insuring the complete removal of the obstructions from the rows, and leaving the ground fine and clear at and near the furrow.

We are aware that furrow openers and clearers of various forms have been used before, but so far as we are advised no previous arrangement of a double share and a double mold-board plow or furrow-clearer, completely turning furrows both ways, have been used in this connection.

We have shown suitable mechanism connecting the gear on the driving-shaft and the revolving disk for operating the machine, but any other known appropriate mechanism may be used.

Having thus described our invention, what we claim as new, and desire to secure by Letters Patent, is—

1. The bail L, provided with the attaching and adjusting flange *t*, and angle-adjusting rod *m*, for mounting the drill-tooth upon, substantially as and for the purpose herein specified.

2. The double share and full double mold-board furrow-clearing plow *w*, in combination with the drill-tooth I, substantially as and for the purpose herein set forth.

3. A vertically and circularly adjustable brush, arranged in front of the seed-delivery opening, for the purpose of regulating the quantity of seed dropped, and freeing it, before being dropped, from the mass of seed in the hopper, substantially as specified.

4. In the seed-box, the cove, as shown, for the reception of the brush, whereby the grain is prevented from passing behind the brush.

In testimony whereof we have hereunto set our hands this 24th day of August, 1874.

DANIEL LUSE.
DANIEL F. LUSE.

Witnesses:
CYRUS LUSE,
LEVI MURRAY.